United States Patent
Tonry et al.

(10) Patent No.: US 11,340,796 B2
(45) Date of Patent: May 24, 2022

(54) METHOD FOR MANAGING SLEEP MODE AT A DATA STORAGE DEVICE AND SYSTEM THEREFOR

(71) Applicant: DELL PRODUCTS, LP, Round Rock, TX (US)

(72) Inventors: Richard M. Tonry, Austin, TX (US); Lip Vui (Simon) Kan, Hillbrooks (SG)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 16/556,954

(22) Filed: Aug. 30, 2019

(65) Prior Publication Data
US 2021/0064253 A1 Mar. 4, 2021

(51) Int. Cl.
*G06F 3/06* (2006.01)
*G06F 9/4401* (2018.01)
*G06F 21/31* (2013.01)

(52) U.S. Cl.
CPC .......... *G06F 3/0622* (2013.01); *G06F 3/0659* (2013.01); *G06F 3/0673* (2013.01); *G06F 9/4418* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 8,978,135 B2* | 3/2015 | Pearson | G06F 1/3234 726/22 |
| 10,114,778 B2 | 10/2018 | Worley et al. | |
| 2010/0125908 A1* | 5/2010 | Kudo | G06F 21/79 726/19 |
| 2012/0124663 A1* | 5/2012 | Russo | G06F 21/33 726/19 |
| 2013/0173942 A1* | 7/2013 | Forristal | G06F 1/32 713/323 |
| 2014/0006799 A1* | 1/2014 | Zmudzinski | G06F 21/6209 713/189 |
| 2017/0177870 A1* | 6/2017 | Hildebrand | G06F 21/81 |
| 2017/0293751 A1* | 10/2017 | Lu | H04L 9/0891 |
| 2018/0189081 A1 | 7/2018 | Upasani et al. | |
| 2018/0293407 A1* | 10/2018 | Wu | G06F 21/78 |
| 2018/0365041 A1 | 12/2018 | Jin | |
| 2019/0377585 A1* | 12/2019 | Hans | G06K 19/0719 |

* cited by examiner

*Primary Examiner* — Stephanie Wu
(74) *Attorney, Agent, or Firm* — Larson Newman, LLP (57) ABSTRACT

A method includes issuing a suspend command to a data storage device at an information handling system. In response to receiving the suspend command, the data storage device generates a one-time password that is stored at the data storage device. The one-time password is provided to a process executing at the information handling system that stores the one-time password at a memory device at the information handling system. Operation of the data storage device is transitioned to an energy saving state.

15 Claims, 5 Drawing Sheets

FIG. 5

METHOD FOR MANAGING SLEEP MODE AT A DATA STORAGE DEVICE AND SYSTEM THEREFOR

FIELD OF THE DISCLOSURE

This disclosure generally relates to information handling systems, and more particularly relates to managing a sleep mode at a data storage device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. The software resources include device drivers and firmware that control operation and interoperability of system components.

SUMMARY

A method may include issuing a suspend command to a data storage device at an information handling system. In response to receiving the suspend command, the data storage device generates a one-time password that is stored at the data storage device. The one-time password is provided to a process executing at the information handling system that stores the one-time password at a memory device at the information handling system. Operation of the data storage device is transitioned to an energy saving state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
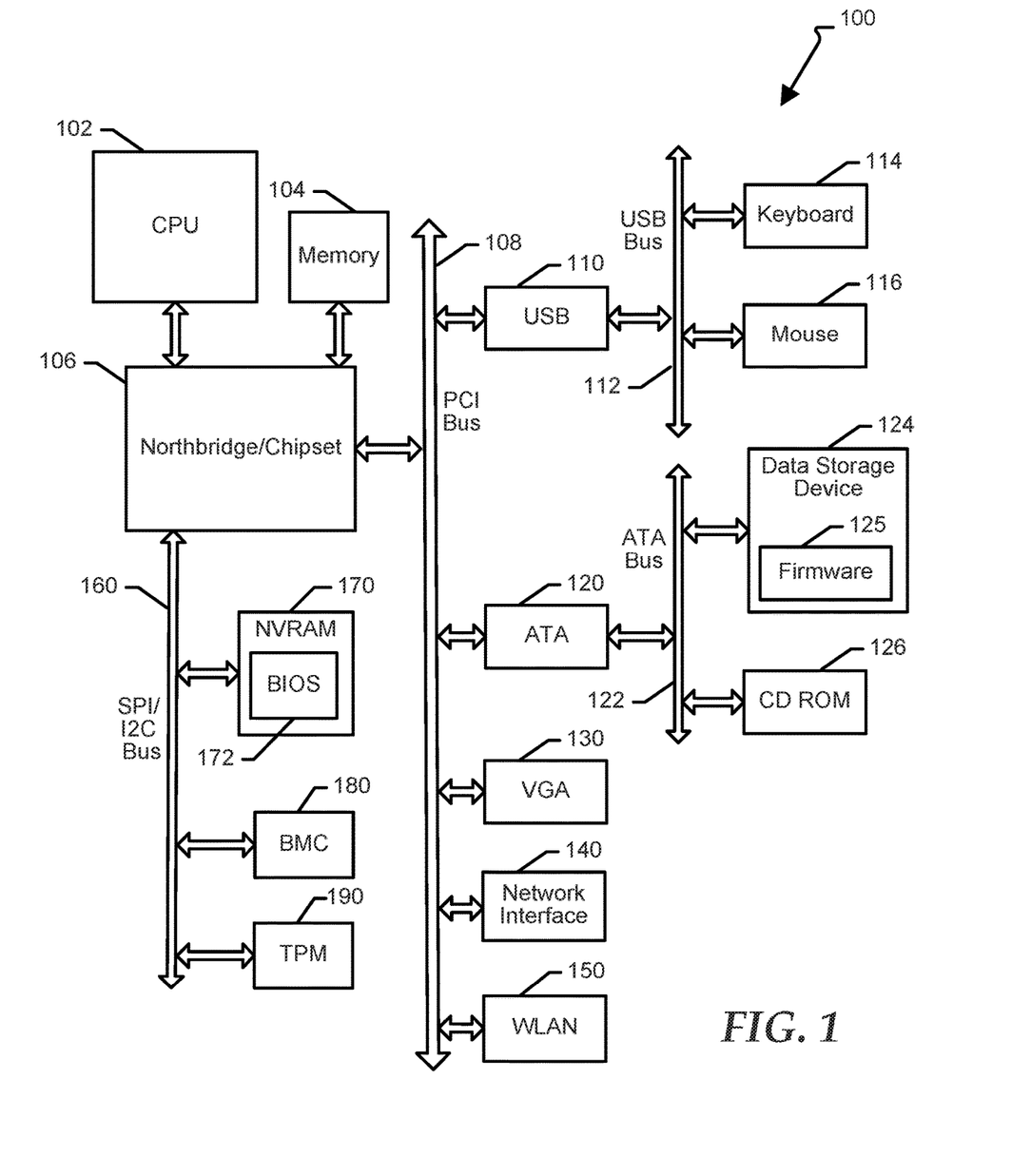
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124 including firmware 125, a compact disk read only memory (CD RUM) device 126, a video graphics array (VGA) device 130, a network interface controller (MC) 140, a wireless local area network (WLAN) controller 150, a serial peripheral interface (SPI) bus 160, a NVRAM 170 for storing BIOS 172, a baseboard management controller (BMC) 180, and a trusted platform module (TPM) 190. BMC 180 can be referred to as a service processor, an embedded controller (EC), and the like. BMC 180 includes a processor that can operate out-of-band with respect to CPU 102. For example, remote management systems can utilize BMC 180 to access components at information handling system independent of an operating state of CPU 102. BMC 180 may be responsible for performing low level hardware tasks including thermal management and power management operations. TPM 190 is compliant with an international standard for a secure cryptoprocessor, a dedicated microcontroller designed to secure hardware through integrated cryptographic keys. NVRAM 170 can be referred to as a SPI flash storage device, BIOS SPI, and the like.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

A data storage device, such as a hard drive, a solid state drive, and the like, may support an authentication procedure to control access to information stored at the data storage device. For example, during BIOS initialization a user of information handling system 100 can be prompted for a password that must be provided to unlock access to the data storage device. Authentication credentials, such as the password, can be stored at a memory device at data storage device 124. During BIOS initialization, firmware 125 can compare the password provided by the user with the password stored at data storage device 124, allowing subsequent access to device 124 if authentication is successful. Password authentication can typically be enabled/disabled at a BIOS setup configuration interface accessible during BIOS initialization at information handling system 100.

An information handling system typically includes hardware circuitry and/or software processes responsible for transitioning operation of selected components of the information handling system into an energy saving mode, often referred to a sleep mode, hibernate mode, standby mode, and the like. For example, many information handling systems are compliant with the Advanced Configuration and Power Interface (ACPI) specification and associated component architecture. The ACM specification presently defines four global operating states and six sleep states. For example, global state G0 including sleep state S0 is the working state of information handling system 100 where the system is running and CPU 102 is executing instruction, accessing information at data storage device 124, and the like. Global state G1 includes sleep states S1, S2, S3, and S4 that correspond to various degrees of attenuated operation of various system components. For example, sleep state S3, commonly referred to as Standby, Sleep, or Suspend to Ram, is a sleep mode where system memory 104 remains active to preserve the computational state of information handling system 100, while CPU 102, data storage device 124, and other selected components are fully or partially turned off/unenergized. Operation of system 100 can be restored to the working state S0 by chipset circuitry, for example in response to a user striking a key at keyboard 114, movement of mouse 116, and the like. Sleep state S4, also referred to as Hibernation or Suspend to Disk, is a sleep mode where the contents of system memory 104 is saved to a non-volatile storage device, such as data storage device 124, and the majority of the components at system 100 are powered down.

When an information handling system transitions from a sleep state, such as sleep state S3 to the working state S0, the system typically provides the data storage device password that the user supplied during the BIOS initialization to corresponding data storage device in order to restore accessibility to the device. The data storage device password must therefore be saved at a memory device for the entire time that the system is operational or in Suspend state S3. Accordingly, the stored data storage device password may be vulnerable to discovery by a malicious attack. Techniques disclosed herein provide an alternative to storing the data storage device password after the storage device is unlocked during BIOS initialization, thus preventing such an attack from acquiring the password. These techniques can be better understood with reference to FIGS. 2-5.

Figure 2:
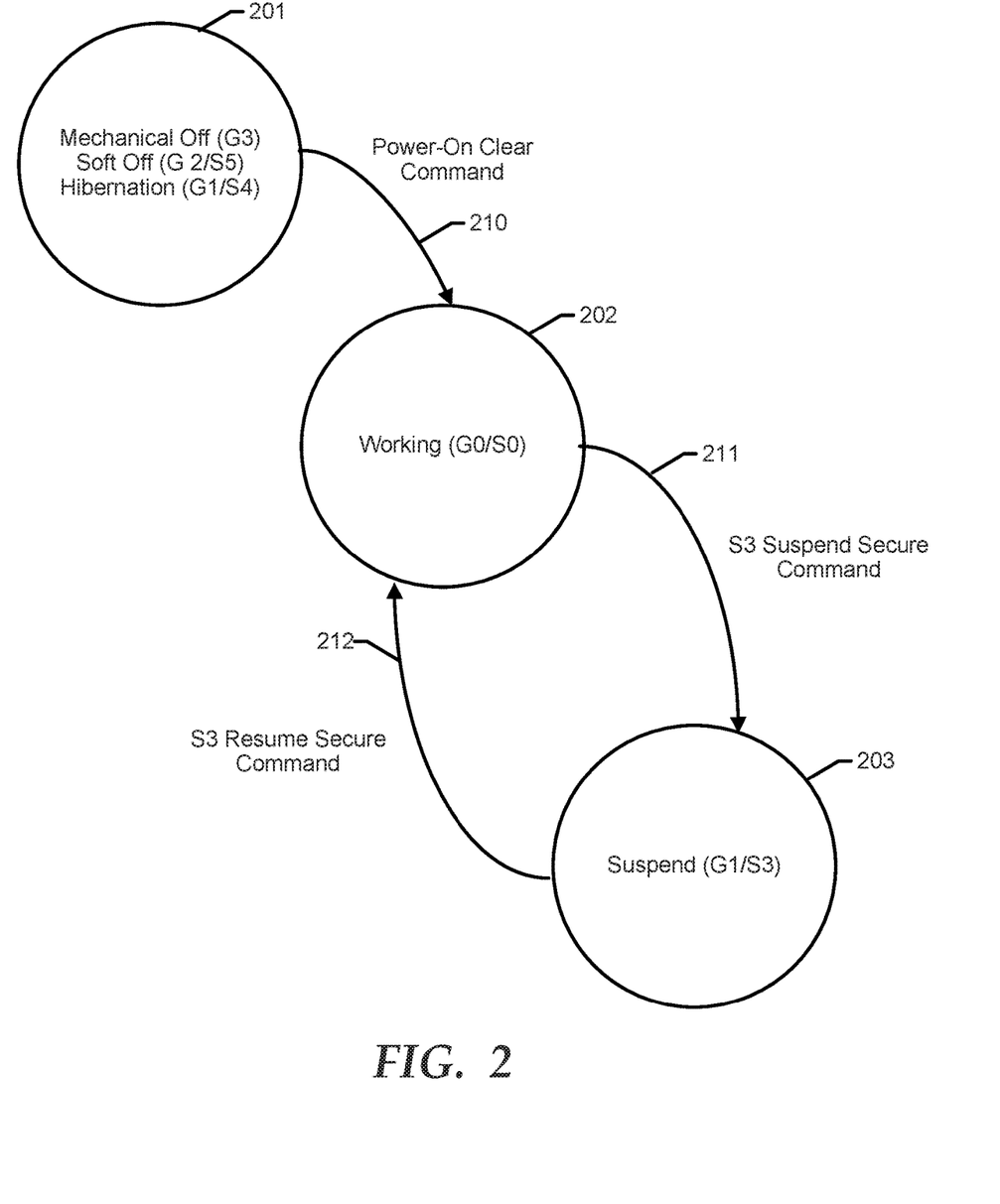
FIG. 2 is a state diagram illustrating how an information handling system can transition between operating states according to a specific embodiment of the present disclosure.

FIG. 2 shows how information handling system 100 can transition between operating states according to a specific embodiment of the present disclosure. FIG. 2 includes block 201 representing one of a Mechanical Off state (G3), a Soft Off state (G2/S5), a Hibernation state (G1/S4), or the like; block 202 representing the working state (G0/S0); and block 203 representing the Suspend state (G1/S3). FIG. 2 also includes state transition indicators 210, 211, and 212. Transition 210 from block 201 (off) to block 202 (working) is accompanied or initiated by the issuance of a Power-On Clear command by chipset circuitry included at information handling system, such as chipset 106. Transition 211 from block 202 (working) to block 203 (suspend) is accompanied by a S3 Suspend Secure command. Transition 212 from block 203 (suspend) to block 202 (working) is accompanied by a S3 Resume Secure command. The S3 Suspend Secure command can be provided to data storage device 124 and to other data storage devices that have password authentication enabled.

As disclosed herein, the S3 Suspend Secure command is a request to the data storage device 124 to generate a one-time password prior to transitioning the S3 Suspend state. Data storage device 124 can acknowledge receipt of the S3 Suspend Secure command by returning the generated one-time password to a runtime process executing at information handling system 100. Data storage device 124 maintains a copy of the generated one-time password. The runtime process also stores the one-time password at a secure location at information handling system. The one-time password must be provided to data storage device 124 in order to re-enable data accesses when system 100 returns to working state 202 from suspend state 203.

When chipset circuitry at information handling system 100 initiates resumption of normal operation following a suspend event, BIOS firmware can send the S3 Resume Secure command to data storage device 124. The S3 Resume Secure command is accompanied by the one-time password previously received from data storage device 124 in response to the S3 Suspend Secure command. Data storage device 124 can compare the one-time password accompanying the S3 Resume Secure command to the copy of the one-time password stored at device 124, and re-enable access only if the one-time passwords match. Once data storage device 124 is unlocked, the one-time key stored at the data storage device is deleted or marked as invalid and can not be used again to unlock the device. One of skill will appreciate that the disclosed techniques are applicable to other energy-saving modes where a locked data storage device requires authentication credentials to restore accessibility, the S3 Suspend state being one example.

Figure 3:
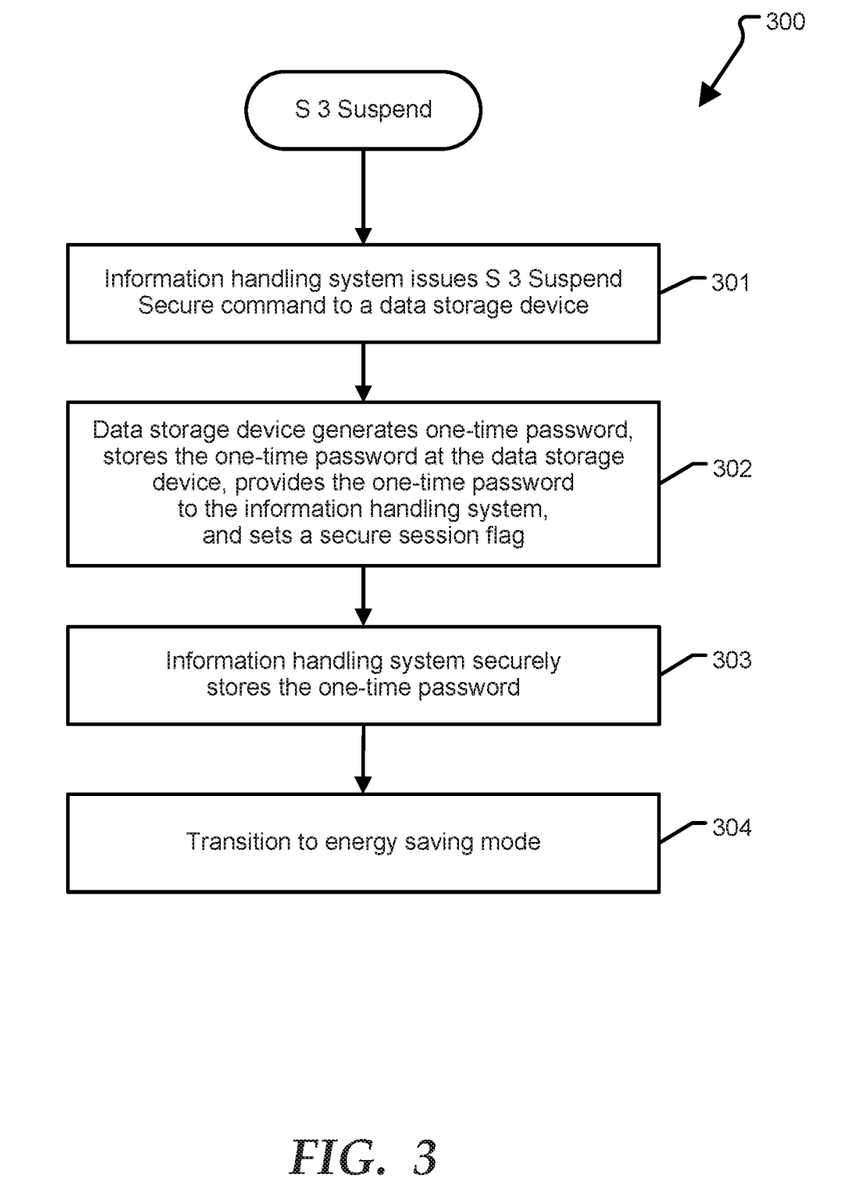
FIG. 3 is a flow diagram illustrating transitioning an information handling system into a suspend state according to a specific embodiment of the present disclosure.

FIG. 3 shows a method 300 for transitioning information handling system 100 into a suspend state according to a specific embodiment of the present disclosure. Method 300 begins at block 301 where an information handling system issues a S3 Suspend Secure command to a data storage device. For example, a runtime process executing at information handling system 100 can respond to a chipset or BMC request to enter an energy saving mode by sending the S3 Suspend Secure command to data storage device 124. At block 302, the data storage device responds to the S3 Suspend Secure command by generating a one-time password and optionally setting a secure session flag indicating that the Suspend Secure command was processed. For example, firmware 125 at data storage device 124 can generate the one-time password, store the password at device 124, and provide the password to the runtime process. At block 303, the information handling system securely stores the one-time password. For example, the runtime process can initiate a supervisor mode interrupt to store the one-time password at NVRAM 170, seal the one-time password at TPM 190, or the like. The one-time password can be encrypted before storing. At block 304, information handling system 100 and data storage device 124 transition to an energy saving mode, such as the Suspend (G1/S3) sleep state.

Figure 4:
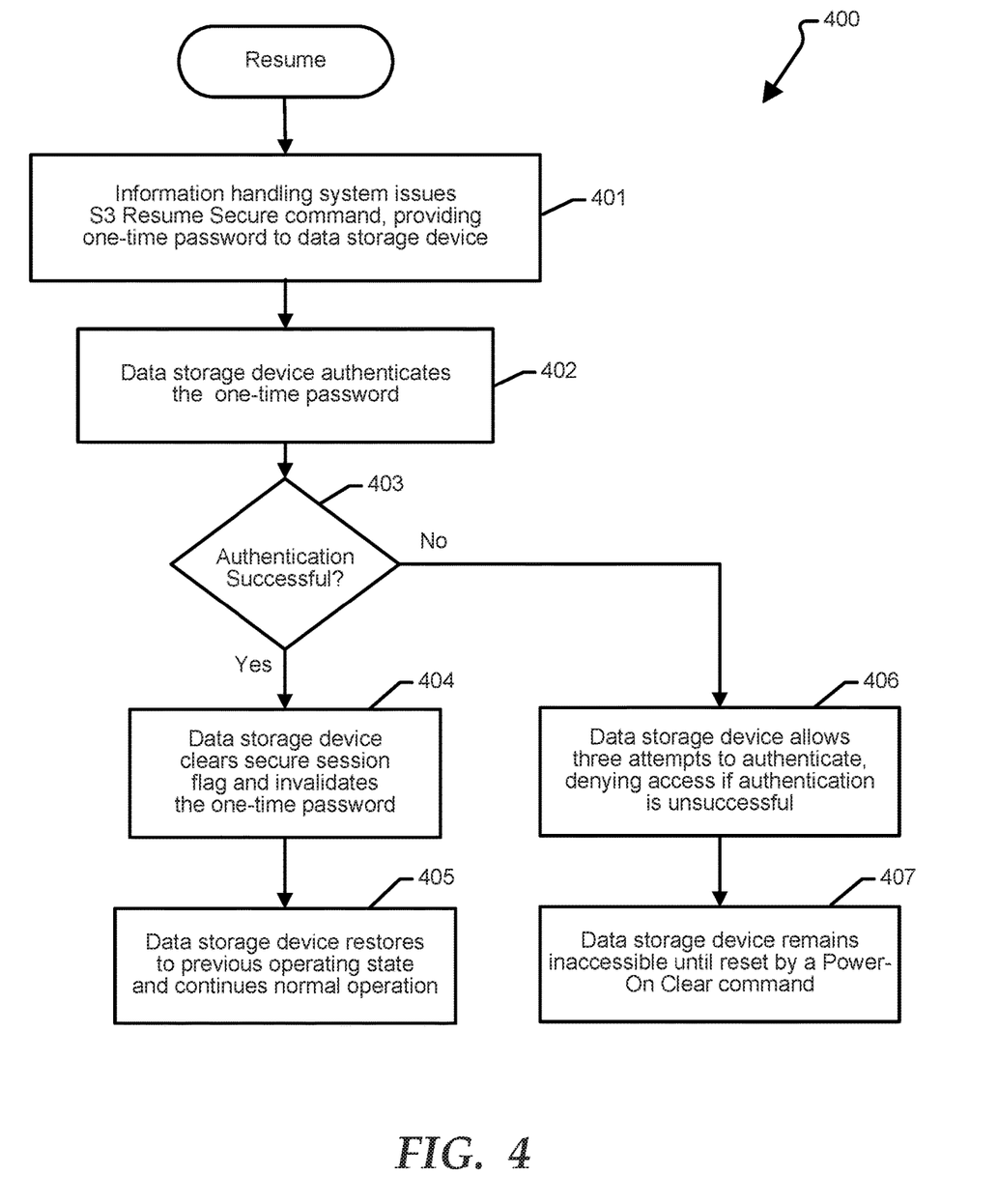
FIG. 4 is a flow diagram illustrating a method for transitioning an information handling system from a suspend state to a normal operating state according to a specific embodiment of the present disclosure.

FIG. 4 shows a method 400 for transitioning information handling system 100 from a suspend state to a normal operating state according to a specific embodiment of the present disclosure. Method 400 begins at block 401 where an information handling system issues an S3 Resume Secure command to a data storage device, the command accompanied by the one-time password that the device generated before transitioning to an energy saving state. For example, information handling system begins the transition from an energy-saving suspend state by executing platform initiation firmware included at BIOS 172. The firmware retrieves the one-time password from the secure storage location at information handling system 100 and provides the password to data storage device 124. At block 402, the data storage device authenticates the one-time password by comparing the password received from information handling system 100 with the copy of the password stored at the data storage device.

If authentication is successful, method 400 proceeds from decision block 403 to block 404 where the data storage device clears the secure session flag and invalidates the one-time password. Accordingly, the one-time password can not be used to unlock access to the data storage device after once successfully doing so. Method 400 continues at block 405 where the data storage device is restored to the previous operating state and allowing access to information stored at the device. Returning to decision block 403, if authentication is unsuccessful, method 400 continues at block 406 where the data storage device allows three attempts to authenticate, denying access if authentication is unsuccessful after three attempts. A lesser or a greater number of failed authentication attempts can be supported. If authentication is unsuccessful after a predetermined number of attempts, method 400 completes at block 407 where the data storage device remains inaccessible until reset by a Power-On Clear command.

Figure 5:
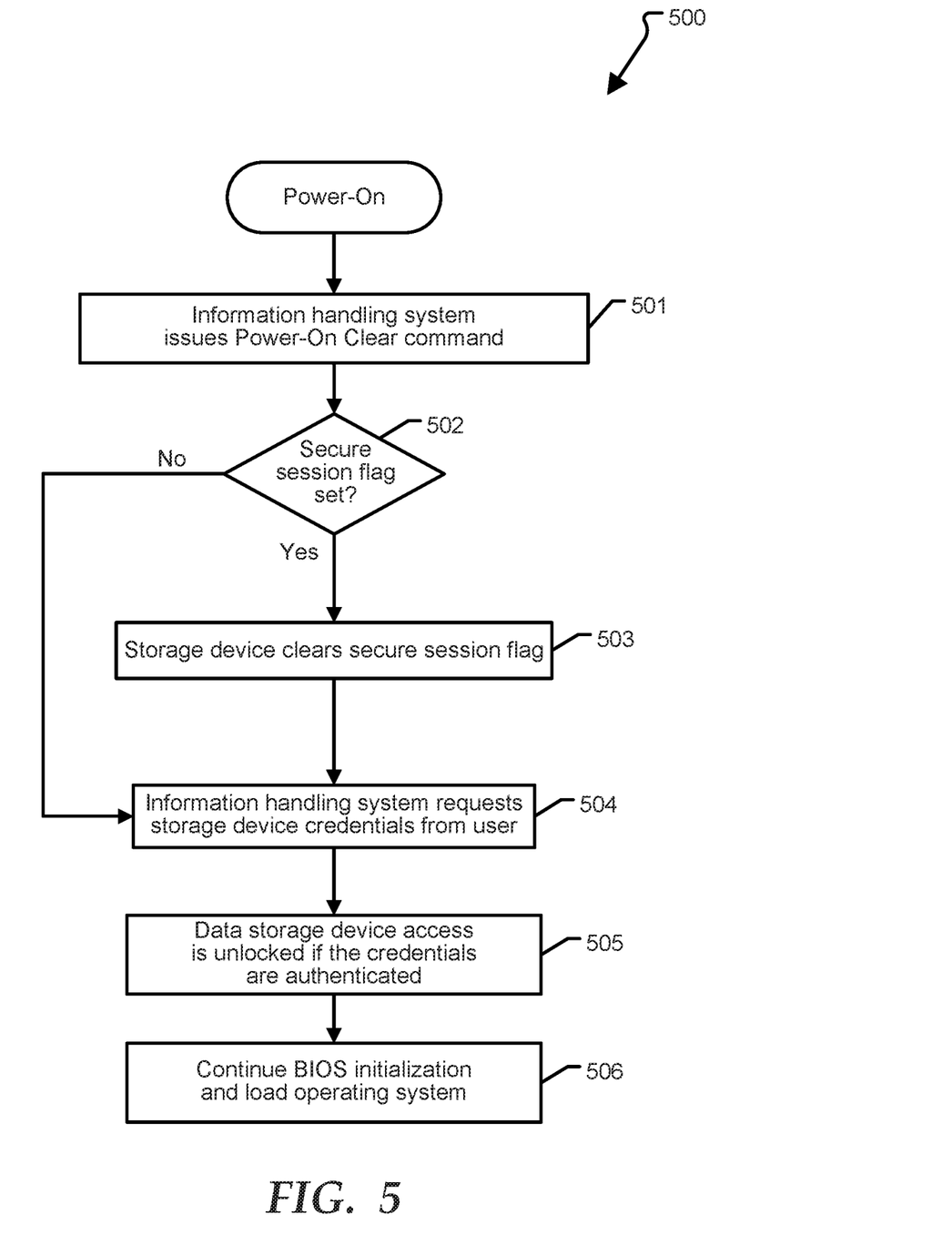
FIG. 5 is a flow diagram illustrating a method for re-initializing a data storage device to a default state that requires receipt of data storage device credentials from a user before allowing information stored at the device to be accessed, according to a specific embodiment of the present disclosure.

FIG. 5 shows a method 500 for re-initializing a data storage device to a default state that requires receipt of the data storage device credentials from a user before allowing information stored at the device to be accessed, according to a specific embodiment of the present disclosure. Method 500 begins at block 501 where an information handling system issues a Power-On Clear command to a data storage device. The data storage device is initialized in a locked state. If the secure session flag is presently set, method 500 proceeds from decision block 502 to block 503 where the storage device clears the secure session flag. The method continues at block 504 where the information handling system requests the storage device credentials from a user. For example, during a BIOS initialization procedure, BIOS firmware 172 can prompt the user for the storage device credentials. Returning to decision block 502, if the secure session flag was not set, method 500 proceeds directly to block 504. At block 505, access to information stored at the data storage device is enabled. If the credentials are not authenticated, access to information stored at the data storage device is denied. Method 500 completes at block 506 where the BIOS initialization procedure continues and an operating system is loaded.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    issuing a suspend command to a data storage device at an information handling system, the suspend command to transition operation of the data storage device to an energy saving state;
    generating a one-time password at the data storage device in response to receiving the suspend command, receipt of the one-time password at the data storage device is required to transition operation of the data storage device from the energy saving state to a normal operating state, wherein the one-time password is invalidated upon transition from the energy saving state to the normal operating state;
    initiating an interrupt for storing the one-time password at the data storage device;
    sending an acknowledgment of the receipt of the suspend command and providing the one-time password to a process executing at the information handling system;
    storing, by the process, the provided one-time password at a memory device at the information handling system; and transitioning operation of the data storage device to the energy saving state,
wherein the data storage device is a hard drive or a solid state drive.

2. The method of claim 1, further comprising:
issuing a resume command to the data storage device, the resume command including the one-time password stored at the memory device, the resume command being a request to transition operation of the data storage device from the energy saving state to the normal operating state;
in response to successfully authenticating the one-time password at the data storage device by determining at the data storage device that the one-time password included with the resume command matches the one-time password stored at the data storage device:
invalidating the one-time password stored at the data storage device; and
transitioning the operation of the data storage device from the energy saving state to the normal operating state; and
in response to unsuccessfully authenticating the one-time password at the data storage device by determining at the data storage device that the one-time password included with the resume command does not match the one-time password stored at the data storage device, denying access to data stored at the data storage device.

3. The method of claim 2, further comprising in response to unsuccessfully authenticating the one-time password at the data storage device for a predetermined number of attempts, the data storage device remains inaccessible until a power-on clear command is received.

4. The method of claim 2, wherein the successfully authenticating further comprises:
determining that the one-time password accompanying the resume command does not match the one-time password stored at the data storage device;
receiving a second resume command at the data storage device, the resume command including the one-time password; and
determining that the one-time password accompanying the second resume command matches the one-time password stored at the data storage device.

5. The method of claim 1, wherein the memory device is a non-volatile memory for storing a basic input/output system.

6. The method of claim 1, further comprising:
setting a flag at the data storage device indicating that the suspend command was received at the data storage device.

7. The method of claim 6, further comprising:
issuing a power-on clear command to the data storage device;
resetting the flag if previously set;
requesting authentication credentials from a user of the information handling system;
unlocking the data storage device for access if the authentication credentials are successfully authenticated; and
executing basic input/output instructions to fully initialize the information handling system.

8. A data storage device at an information handling system, the data storage device configured to:
receive a suspend command to transition operation of the data storage device to an energy saving state;
generate a one-time password in response to receiving the suspend command, receipt of the one-time password at the data storage device is required to transition operation of the data storage device from the energy saving state to a normal operating state, wherein the one-time password is invalidated upon transition from the energy saving state to the normal operating state;
initiate an interrupt to store the one-time password at the data storage device;
send an acknowledgment of the receipt of the suspend command and provide the one-time password to a process executing at the information handling system, the process to store the one-time password at a memory device at the information handling system; and
transition operation to the energy saving state,
wherein the data storage device is a hard drive or a solid state drive.

9. The data storage device of claim 8, wherein the data storage device is further to:
receive a resume command, the resume command including the one-time password stored at the memory device, the resume command being a request to transition operation of the data storage device from the energy saving state to the normal operating state;
in response to successful authentication of the one-time password associated with the resume command by determining at the data storage device that the one-time password included with the resume command matches the one-time password stored at the data storage device:
invalidate the one-time password stored at the data storage device; and
transition operation from the energy saving state to the normal operating state; and
in response to unsuccessful authentication of the one-time password associated with the resume command by determining at the data storage device that the one-time password included with the resume command does not match the one-time password stored at the data storage device, deny access to data stored at the data storage device.

10. The data storage device of claim 9, wherein the successful authentication further comprises:
determining that the one-time password accompanying the resume command does not match the one-time password stored at the data storage device;
receiving a second resume command at the data storage device, the resume command including the one-time password; and
determining that the one-time password accompanying the second resume command matches the one-time password stored at the data storage device.

11. The data storage device of claim 8, wherein the data storage device is further to:
set a flag at the data storage device indicating that the suspend command was received at the data storage device.

12. The data storage device of claim 11, further comprising:
receive a power-on clear command;
reset the flag when previously set;
receive authentication credentials provided by a user of the information handling system; and
unlock the data storage device for access if the authentication credentials are successfully authenticated.

13. An information handling system comprising:
a processor;
a non-volatile memory device to store a basic input/output system; and
a data storage device configured to:

receive a suspend command to transition operation of the data storage device to an energy saving state;

generate a one-time password in response to receiving the suspend command, receipt of the one-time password at the data storage device required to transition operation of the data storage device from the energy saving state to a normal operating state, wherein the one-time password is invalidated upon transition from the energy saving state to the normal operating state;

initiate an interrupt to store the one-time password at the data storage device;

send an acknowledgement of the receipt of the suspend command and provide the one-time password to a process executing at the information handling system, the process to store the one-time password at a memory device at the information handling system; and transition operation to the energy saving state, wherein the data storage device is a hard drive or a solid state drive.

14. The information handling system of claim 13, wherein the data storage device is further configured to:

receive a resume command, the resume command including the one-time password stored at the memory device, the resume command being a request to transition operation of the data storage device from the energy saving state to the normal operating state;

in response to successful authentication of the one-time password associated with the resume command by determining at the data storage device that the one-time password included with the resume command matches the one-time password stored at the data storage device:

invalidate the one-time password stored at the data storage device; and transition operation from the energy saving state to the normal operating state; and in response to unsuccessful authentication of the one-time password associated with the resume command by determining at the data storage device that the one-time password included with the resume command does not match the one-time password stored at the data storage device, deny access to data stored at the data storage device.

15. The information handling system of claim 13, wherein the data storage device is further to:

receive a power-on clear command;

receive authentication credentials provided by a user of the information handling system; and unlock the data storage device for access if the authentication credentials are successfully authenticated.

\* \* \* \* \*